United States Patent
Fairy et al.

(10) Patent No.: US 7,320,590 B2
(45) Date of Patent: Jan. 22, 2008

(54) MANIFOLD PLUG FOR AN INJECTION MOLDING APPARATUS

(75) Inventors: Fabrice Fairy, Georgetown (CA); Murray Feick, Kitchener (CA); Payman Tabassi, Rockwood (CA)

(73) Assignee: Mold-Masters (2007) Limited, Georgetown, Ontario (CA)

(*) Notice: Subject to any disclaimer, the term of this patent is extended or adjusted under 35 U.S.C. 154(b) by 0 days.

(21) Appl. No.: 11/252,790

(22) Filed: Oct. 19, 2005

(65) Prior Publication Data

US 2006/0083811 A1    Apr. 20, 2006

Related U.S. Application Data

(60) Provisional application No. 60/619,684, filed on Oct. 19, 2004.

(51) Int. Cl.
*B29C 45/00* (2006.01)
(52) U.S. Cl. .............. 425/572; 264/328.8; 264/328.12
(58) Field of Classification Search ............... 425/572; 264/328.8, 328.12
See application file for complete search history.

(56) References Cited

U.S. PATENT DOCUMENTS

| | | |
|---|---|---|
| 3,037,245 A | 6/1962 | Darnell |
| 3,553,788 A | 1/1971 | Putkowski |
| 3,716,318 A | 2/1973 | Erik et al. |
| 4,017,242 A | 4/1977 | Mercer |
| 4,026,518 A | 5/1977 | Gellert |
| 4,173,448 A | 11/1979 | Rees et al. |
| 4,213,751 A | 7/1980 | Fernandez |
| 4,268,240 A | 5/1981 | Rees et al. |
| 4,433,969 A | 2/1984 | Gellert |
| 4,657,496 A | 4/1987 | Ozeki et al. |
| 4,740,151 A | 4/1988 | Schmidt et al. |
| 4,932,858 A * | 6/1990 | Gellert ................ 425/564 |
| 5,022,846 A | 6/1991 | Schmidt |

(Continued)

FOREIGN PATENT DOCUMENTS

DE    2160 535 A1    6/1973

(Continued)

OTHER PUBLICATIONS

"Dynisco One Piece Design Brochure", *Fakuma*, (2000).

*Primary Examiner*—Robert Davis
*Assistant Examiner*—Maria Veronica Ewald
(74) *Attorney, Agent, or Firm*—Medler Ferro PLLC (57) ABSTRACT

An injection molding apparatus includes a manifold having a manifold channel for receiving a melt stream of moldable material under pressure and delivering the melt stream to a nozzle channel of a nozzle. The manifold includes a manifold plug fit within a bore thereof and having a plug melt channel for fluidly connecting the manifold melt channel and the nozzle melt channel. The manifold plug further includes a valve/pressure disk portion that abuts with a back plate of the injection molding apparatus to maintain the spacing therebetween and to accommodate thermal expansion of the manifold relative to the back plate. In an injection molding application utilizing a valve-gated nozzle, the manifold plug may further include a valve pin receiving/guiding bore that functions as a valve pin bushing for a valve pin. A mold cavity communicates with the nozzle channel of the nozzle to receive melt through a mold gate.

29 Claims, 7 Drawing Sheets

U.S. PATENT DOCUMENTS

| | | |
|---|---|---|
| 5,037,598 A | 8/1991 | Axelrud |
| 5,192,556 A | 3/1993 | Schmidt |
| 5,368,470 A | 11/1994 | Manner |
| 5,374,182 A | 12/1994 | Gessner |
| 5,378,138 A | 1/1995 | Onuma et al. |
| 5,851,571 A | 12/1998 | Manner |
| 5,935,616 A | 8/1999 | Gellert et al. |
| 5,955,121 A | 9/1999 | Gellert et al. |
| 6,079,971 A | 6/2000 | Ramond |
| 6,220,851 B1 * | 4/2001 | Jenko .................. 425/549 |
| 6,343,925 B1 | 2/2002 | Jenko |
| 6,669,462 B1 | 12/2003 | Jenko |
| 6,743,009 B1 | 6/2004 | Ramond |
| 6,752,618 B2 | 6/2004 | Dewar et al. |
| 2004/0022893 A1 | 2/2004 | Lebreton |
| 2004/0185138 A1 | 9/2004 | Tabassi |
| 2006/0024401 A1 | 2/2006 | Bazzo et al. |

FOREIGN PATENT DOCUMENTS

| | | |
|---|---|---|
| DE | 23 62 162 A1 | 6/1975 |
| DE | 200 14 043 U1 | 1/2001 |
| DE | 10 2004 052 689 A1 | 1/2006 |
| EP | 1 459 864 A1 | 9/2004 |
| KR | 2000054694 A | 9/2000 |

\* cited by examiner

MANIFOLD PLUG FOR AN INJECTION MOLDING APPARATUS

CROSS-REFERENCE TO RELATED APPLICATIONS

This application is a non-provisional application claiming the benefit under 35 U.S.C. § 119(e) of U.S. Provisional Patent Application No. 60/619,684 filed Oct. 19, 2004.

BACKGROUND OF THE INVENTION

1. Field of the Invention

The present invention relates to an injection molding apparatus and, in particular, to a manifold plug for use in a manifold.

2. Related Art

Manifolds for injection molding systems often include manifold plugs for changing direction of the melt flowing through manifold melt channel, for example, turning the melt channel towards a hot runner nozzle. Manifold plugs are utilized because it is more cost effective to drill out a section of a manifold in which to insert the manifold plug than it is to drill a melt channel including turns directly into the manifold.

Injection molding systems using valve gating often include a valve pin bushing bridging the air gap between the manifold and the back plate in order to guide the valve pin and prevent leakage of melt from the manifold. A valve pin bushing is shown, for example, in U.S. Pat. No. 4,740,151 to Schmidt et al. The Schmidt et al. patent shows a separate manifold plug and a nozzle bolted to the manifold. Utilization of separate pieces to perform the functions of guiding the valve pin, changing direction of the manifold melt channel, and connecting the nozzle to the manifold requires very tight tolerances. Variations in expansion rates and movement during heating can cause such multiple parts to become misaligned, resulting in leakage. Further, having such multiple parts requires a larger inventory.

SUMMARY OF THE INVENTION

According to an embodiment of the present invention, an injection molding apparatus is provided having a manifold with a manifold channel for receiving a melt stream of moldable material under pressure and delivering the melt stream to a nozzle channel of a hot runner nozzle. The manifold includes a manifold plug fit within a bore thereof and having a manifold plug melt channel for fluidly connecting the manifold melt channel and the nozzle melt channel. The manifold plug further includes a pressure disk portion that abuts with a back plate of the injection molding apparatus to maintain the spacing therebetween and to accommodate thermal expansion of the manifold relative to the back plate. The present invention may be used with valve-gated or thermal gated hot runner nozzles. In an injection molding application utilizing a valve-gated nozzle, the manifold plug may further include a valve pin receiving/guiding bore that functions as a valve pin bushing for a valve pin. A mold cavity communicates with the nozzle channel of the hot runner nozzle to receive melt through a mold gate.

In one embodiment, the manifold plug is provided with a threaded portion receivable within a threaded recess of the hot runner nozzle such that the nozzle and manifold have a threaded connection. In another embodiment, a back end of the hot runner nozzle abuts with a downstream end of the manifold plug to allow for sliding therebetween during thermal expansion.

BRIEF DESCRIPTION OF THE FIGURES

Embodiments of the present invention will now be described more fully with reference to the accompanying drawings in which like reference numerals indicate similar structure.

DETAILED DESCRIPTION OF THE INVENTION

Figure 1:
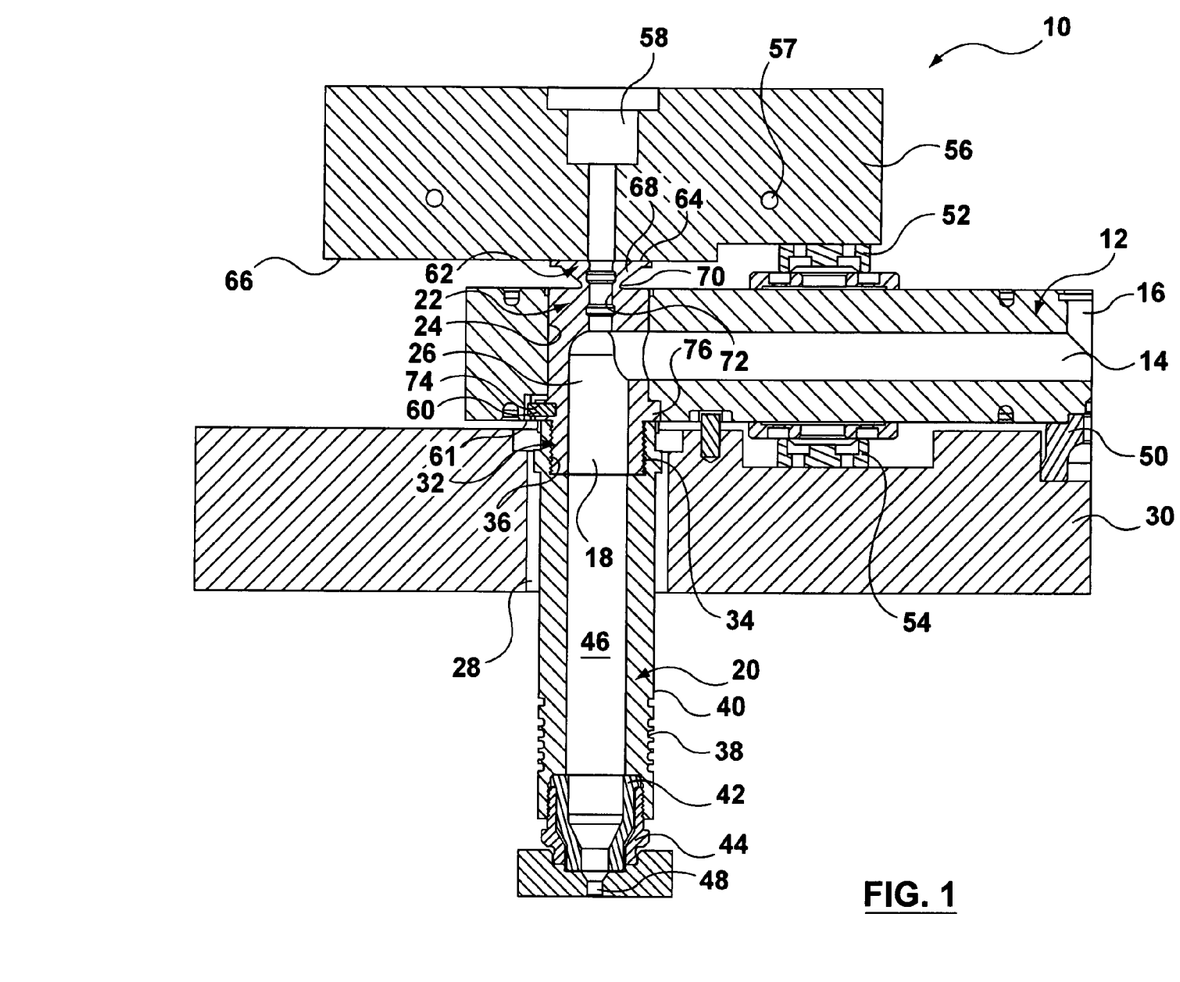
FIG. 1 is a side sectional view of a portion of an injection molding apparatus according to an embodiment of the present invention.

Referring now to FIG. 1, an injection molding apparatus 10 is generally shown. Injection molding apparatus 10 includes a manifold 12 having a manifold melt channel 14. A manifold plug 22 is received in a bore 24 that is provided in the manifold 12. The manifold plug 22 includes a melt channel 26 that extends therethrough to redirect the melt flow between the manifold melt channel 14 and a manifold outlet 18. Inlet 16 of manifold melt channel 14 receives melt from a machine nozzle (not shown) through a sprue bushing (not shown) and delivers the melt to a hot runner nozzle 20, which is in fluid communication with manifold outlet 18.

The nozzle 20 is received in an opening 28 in a mold plate 30. Nozzle 20 includes a recess 36 that receives a downstream end 32 of the manifold plug 22. The nozzle 20 is coupled to the downstream end 32 of the manifold plug 22 by a threaded connection 34. Nozzle 20 is heated by a heating element (not shown) that is wound around the nozzle 20 and is received in grooves 38, which are provided in an outer surface 40 of the nozzle 20. The nozzle 20 further includes a thermocouple (not shown).

Although only a single hot runner nozzle 20 is shown in FIG. 1, it will be appreciated that a typical injection molding apparatus may include a plurality of manifold outlets such that each manifold outlet 18 delivers melt to a respective hot runner nozzle.

A nozzle tip 42 is received in a downstream end of nozzle 20. Nozzle tip 42 is coupled to nozzle 20 by a transfer seal 44. A nozzle melt channel 46 extends through nozzle 20 and nozzle tip 42. Nozzle melt channel 46 is in communication with manifold outlet 18 and receives melt from manifold channel 14. A mold cavity (not shown) receives melt from nozzle melt channel 46 through a mold gate 48. Cooling channels (not shown) cool the mold cavity. Manifold 12 is maintained in position relative to mold plate 30 by a locating ring 50. Spacers 52 and 54 are provided between manifold 12 and a back plate 56 and manifold 12 and mold plate 30, respectively. Cooling channels 57 cool back plate 56.

A cavity 58 is provided in back plate 56 for receiving an actuator (not shown) for a valve pin (not shown). The actuator may be any suitable type, such as pneumatic or hydraulic, for example. The valve pin selectively engages mold gate 48 to control melt flow into the mold cavity.

Figure 2:
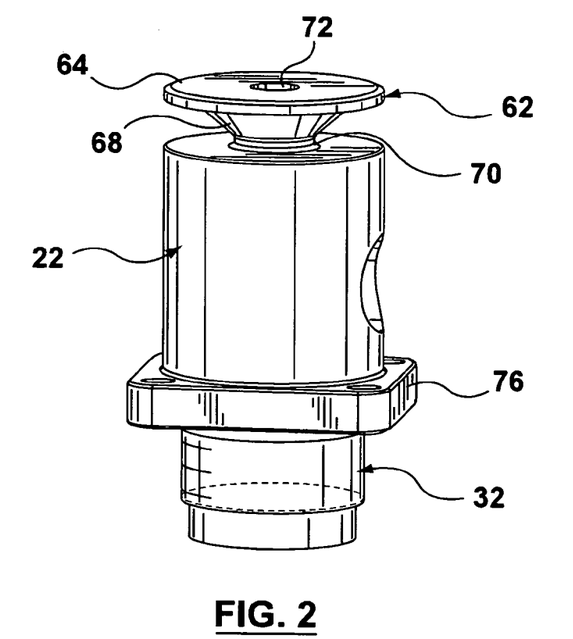
FIG. 2 is an isometric view of a manifold plug of FIG. 1.

Referring also to FIG. 2, manifold plug 22 includes a valve/pressure disk portion 62 having an upper surface 64 that contacts a lower surface 66 of back plate 56. In one embodiment, the valve disk is made as an integral part of the manifold plug, such that the manifold plug and valve disk are one piece. The valve disk 62 further includes a generally conical shaped body 68 that reduces in cross-sectional area between the upper surface 64 and a neck 70. A valve pin receiving bore 72 extends through the manifold plug 22 and joins the melt channel 26 of the manifold plug 22. The valve pin receiving bore 72 of the manifold plug 22 functions like a valve pin bushing for the valve pin.

Manifold plug 22 is press fit into the manifold bore 24. A dowel 60 is received in an aperture 74, which is provided in an outwardly extending flange 76 of the manifold plug 22. The dowel 60 engages a recess 61 in manifold 12 to maintain the manifold plug 22 in a proper orientation in the bore 24 during the press fitting operation and subsequent operation in the injection molding apparatus 10.

In operation, melt is injected from the machine nozzle through the sprue bushing, manifold channel 14 of manifold 12, melt channel 26 of manifold plug 22, nozzle melt channel 46 of nozzle 20, and mold gate 48 and into the mold cavities. The melt in the mold cavities is then cooled and the molded parts are ejected from injection molding apparatus 10.

Figure 3:
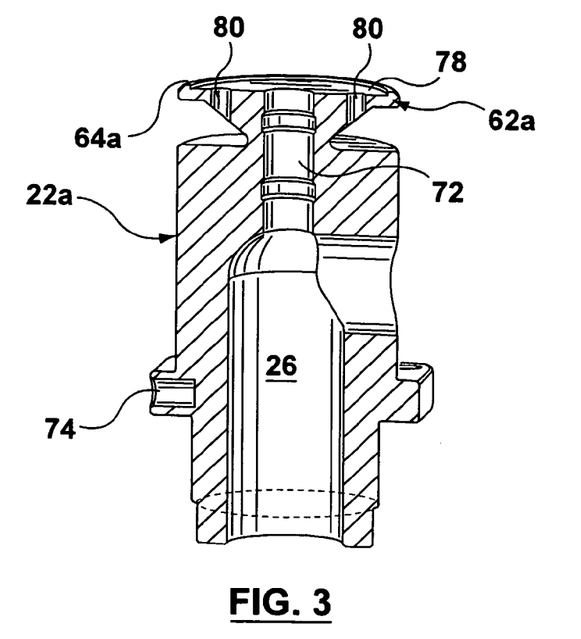
FIG. 3 is an isometric view in section of a manifold plug according to another embodiment of the present invention.

Referring to FIG. 3, another embodiment of a manifold plug 22a is shown. In this embodiment, a recess 78 is cut into upper surface 64a of valve disk 62a. The recess 78 increases the flexibility of the valve disk 62a in order to improve the deflection capability of the valve disk 62a during thermal expansion. Valve disk 62a further includes a pair of apertures 80. The apertures 80 are included in order to provide a drain passage for melt in the event of leakage.

FIGS. 4 to 8 show further embodiments in which like reference numerals are used to identify like parts.

Figure 4:
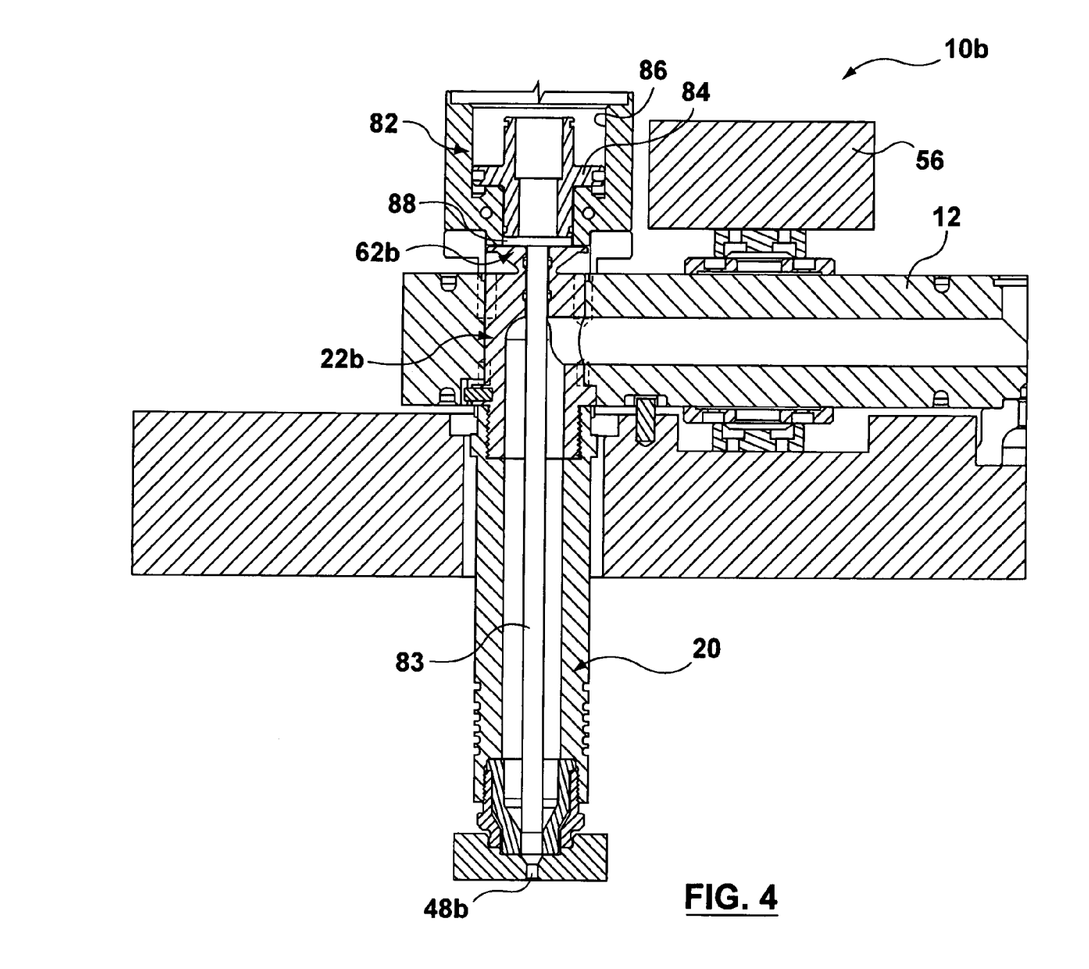
FIG. 4 is a side sectional view of a portion of an injection molding apparatus according to another embodiment of the present invention.

Referring to FIG. 4, another embodiment of an injection molding apparatus 10b is shown. This embodiment is similar to the embodiment of FIG. 1, however, a separate actuator 82 is provided on top of valve disk 62b of manifold plug 22b. The actuator 82 includes a piston 84 that is slidable in a cylinder 86. A valve pin 83 is coupled to a lower surface of a plate 88. The valve pin 83 is selectively retractable by the actuator 82 to open and close mold gate 48b. Seals 85, 87, and 89 are disposed on each side between the piston 84 and the cylinder 86 to prevent leakage of fluid from the actuator 82. As would be apparent to those skilled in the art, and piston/cylinder arrangement as shown in FIG. 4 can be used in the other embodiments shown herein.

Figure 5:
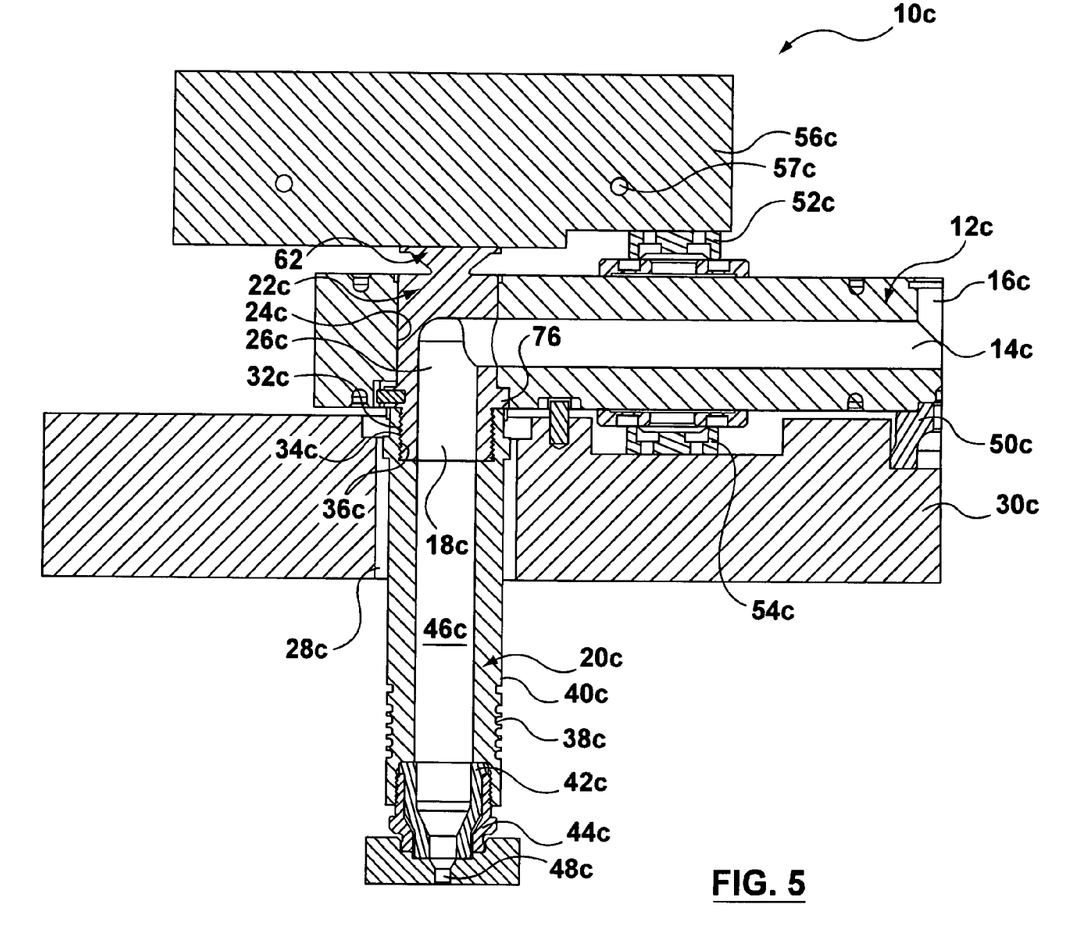
FIG. 5 is a side sectional view of a portion of an injection molding apparatus according to another embodiment of the present invention.

Another embodiment of an injection molding apparatus 10c is shown in FIG. 5. The injection molding apparatus 10c is thermally gated and therefore does not include either an actuator receiving cavity in a back plate 56c or a valve pin receiving bore in a manifold plug 22c. Thermal gating is well known in the art and therefore will not be described here.

Injection molding apparatus 10c includes a manifold 12c having a manifold melt channel 14c. Manifold plug 22c is received in a bore 24c that is provided in the manifold 12c. Manifold plug 22c includes a pressure disk 62c positioned against back plate 56c for maintaining the spacing therebetween and for accommodating thermal expansion of manifold 12c relative to back plate 56c. The manifold plug 22c includes a melt channel 26c that extends therethrough to redirect the melt flow between the manifold melt channel 14c and a manifold outlet 18c. Inlet 16c of manifold melt channel 14c receives melt from a machine nozzle (not shown) through a sprue bushing (not shown) and delivers the melt to a hot runner nozzle 20c, which is in fluid communication with manifold outlet 18c.

The nozzle 20c is received in an opening 28c in a mold plate 30c. The nozzle 20c is coupled to a downstream end 32c of the manifold plug 22c by a threaded connection 34c. Nozzle 20c includes a recess 36c that receives the downstream end 32c of the manifold plug 22c. Nozzle 20c is heated by a heating element (not shown) that is wound around the nozzle 20c and is received in grooves 38c, which are provided in an outer surface 40c of the nozzle 20c. The nozzle 20c further includes a thermocouple (not shown).

A nozzle tip 42c is received in a downstream end of nozzle 20c. Nozzle tip 42c is coupled to nozzle 20c by a transfer seal 44c. A nozzle melt channel 46c extends through nozzle 20c and nozzle tip 42c. Nozzle melt channel 46c is in communication with manifold outlet 18c and receives melt from manifold channel 14c. A mold cavity (not shown) receives melt from nozzle melt channel 46c through a mold gate 48c. Cooling channels (not shown) cool the mold cavity. Manifold 12c is maintained in position relative to mold plate 30c by a locating ring 50c. Spacers 52c and 54c are provided between manifold 12c and back plate 56c and manifold 12c and mold plate 30c, respectively. Cooling channels 57c cool back plate 56c.

Figure 6:
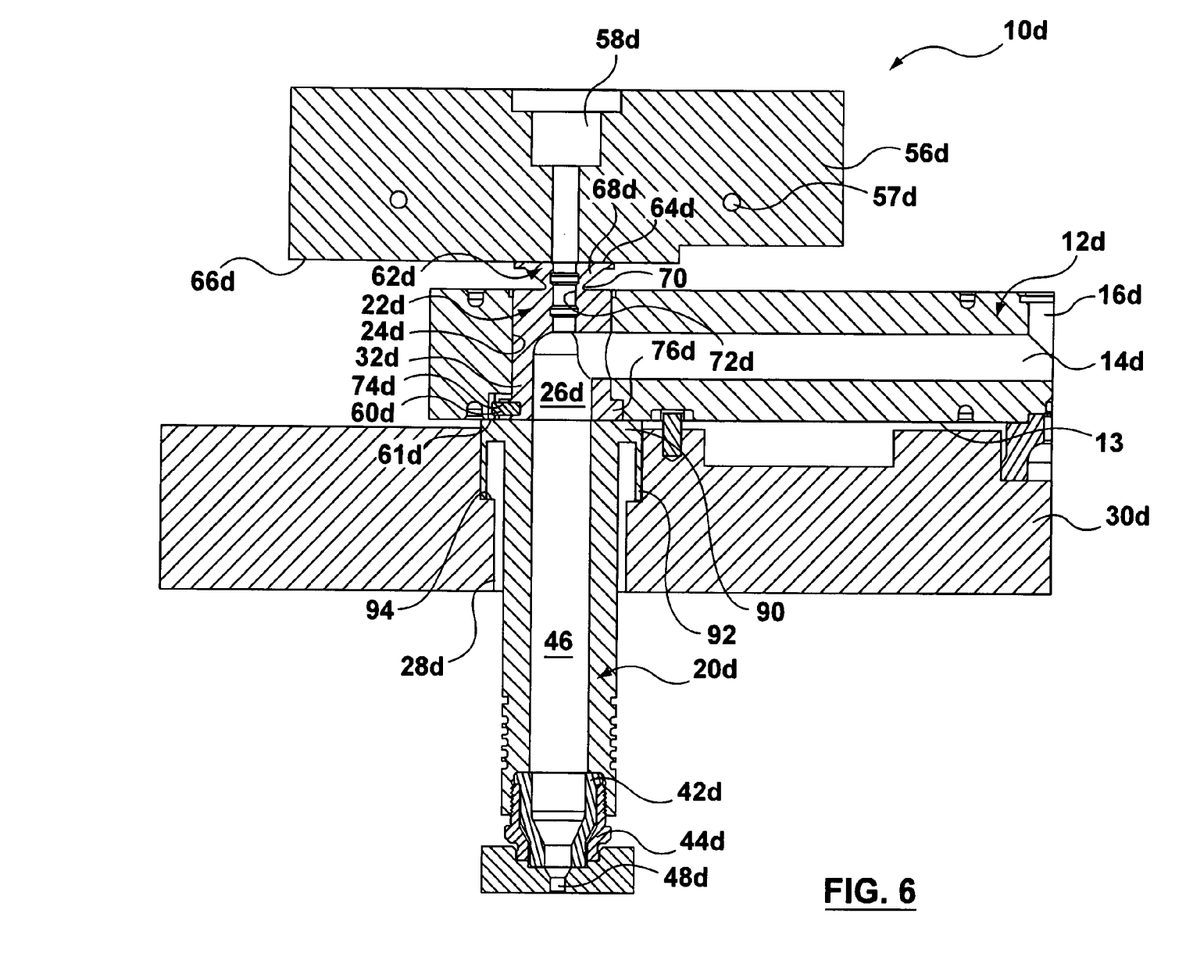
FIG. 6 is a side sectional view of a portion of an injection molding apparatus according to still another embodiment of the present invention.

Referring to FIG. 6, another embodiment of an injection molding apparatus 10d is shown. In this embodiment, a downstream end 32d of a manifold plug 22d is flush with a lower surface 13 of manifold 12d to allow nozzle 20d to slide relative to manifold plug 22d during thermal expansion.

Nozzle 20d includes a nozzle head 90 having a flange 92. The flange 92 abuts a step 94 that is provided in opening 28d of mold plate 30d to maintain the nozzle head 90 in abutment with the lower surface 13 of manifold 12d. Nozzle 20d further includes a nozzle tip 42d that is coupled to the nozzle 20d by a transfer seal 44d.

Similar to the previous embodiments, manifold plug 22d is press fit into manifold bore 24d and includes a dowel 60d that is received in an aperture 74d of outwardly extending flange 76d. The dowel 60d engages a recess 61d in manifold 12d to maintain the manifold plug 22d in a proper orientation in bore 24d. The manifold plug 22d includes a valve disk 62d having an upper surface 64d in contact with a lower surface 66d of back plate 56d. The valve disk 62d further includes a generally conical shaped body 68d that reduces in cross-sectional area between the upper surface 64d and a neck 70d. A valve pin receiving bore 72d extends through the manifold plug 22d and joins the melt channel 26d of the manifold plug 22d. A valve pin (not shown) is slidable through the valve pin receiving bore 72d to selectively seat in mold gate 48d. The valve pin is actuated by an actuator (not shown) that is located in cavity 58d in back plate 56d.

Figure 7:
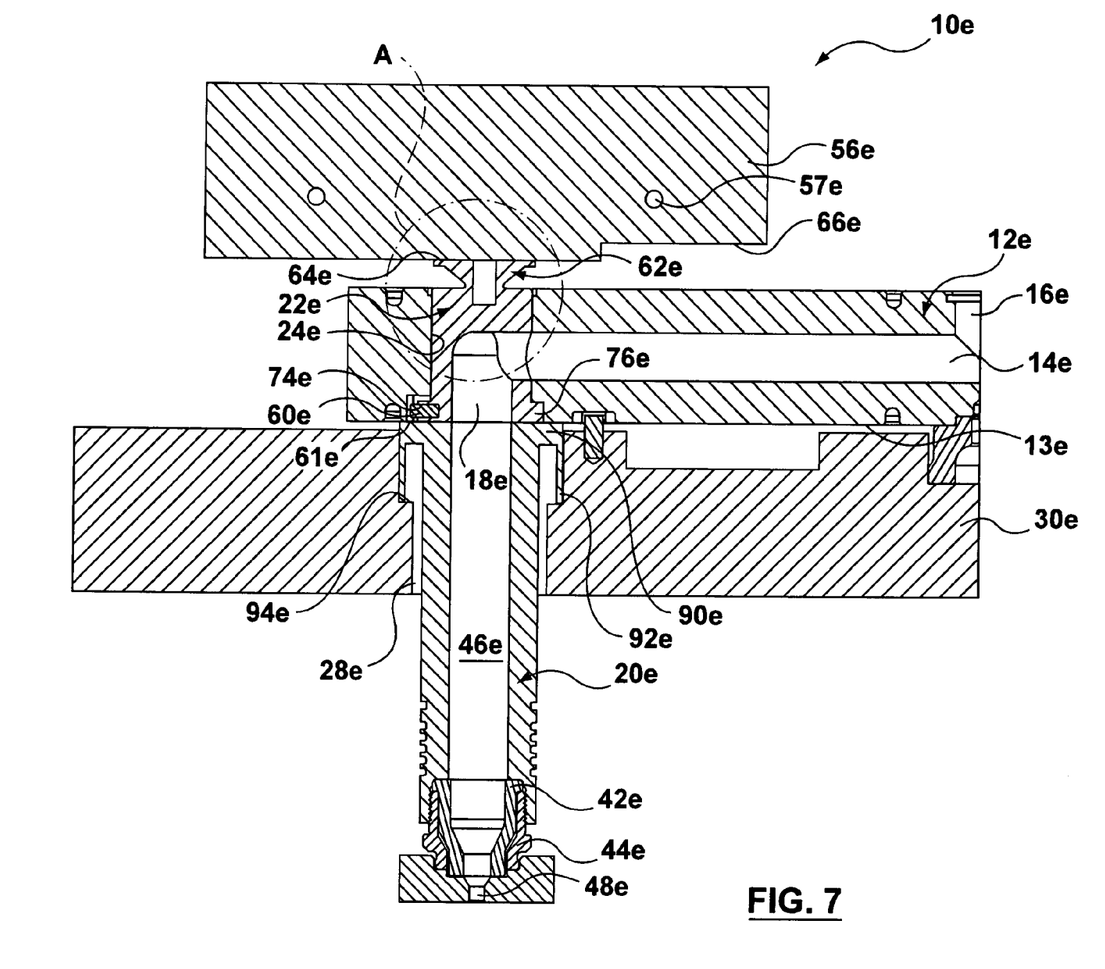
FIG. 7 is a side sectional view of a portion of an injection molding apparatus according to another embodiment of the present invention.

Referring to FIG. 7, another embodiment of an injection molding apparatus 10e is shown. This embodiment is similar to the embodiment of FIG. 6; however, mold gate 48e is thermally gated. The injection molding apparatus 10e includes a nozzle 20e having a nozzle channel 46e for receiving melt from a manifold channel 14e of manifold 12e. The nozzle 20e includes a nozzle head 90e having a flange 92e. The flange 92e abuts a step 94e that is provided in opening 28e of mold plate 30e to maintain the nozzle head 90e in abutment with the lower surface 13e of manifold 12e. Nozzle 20e further includes a nozzle tip 42e that is coupled to the nozzle 20e by a transfer seal 44e.

Manifold plug 22e is press fit into manifold bore 24e and includes a dowel 60e that is received in an aperture 74e of outwardly extending flange 76e. The dowel 60e engages a recess 61e in manifold 12e to maintain the manifold plug 22e in a proper orientation in the bore 24d. A melt channel 26e extends through the manifold plug 22e to redirect the melt flow between the manifold melt channel 14e and a manifold outlet 18e.

Figure 8:
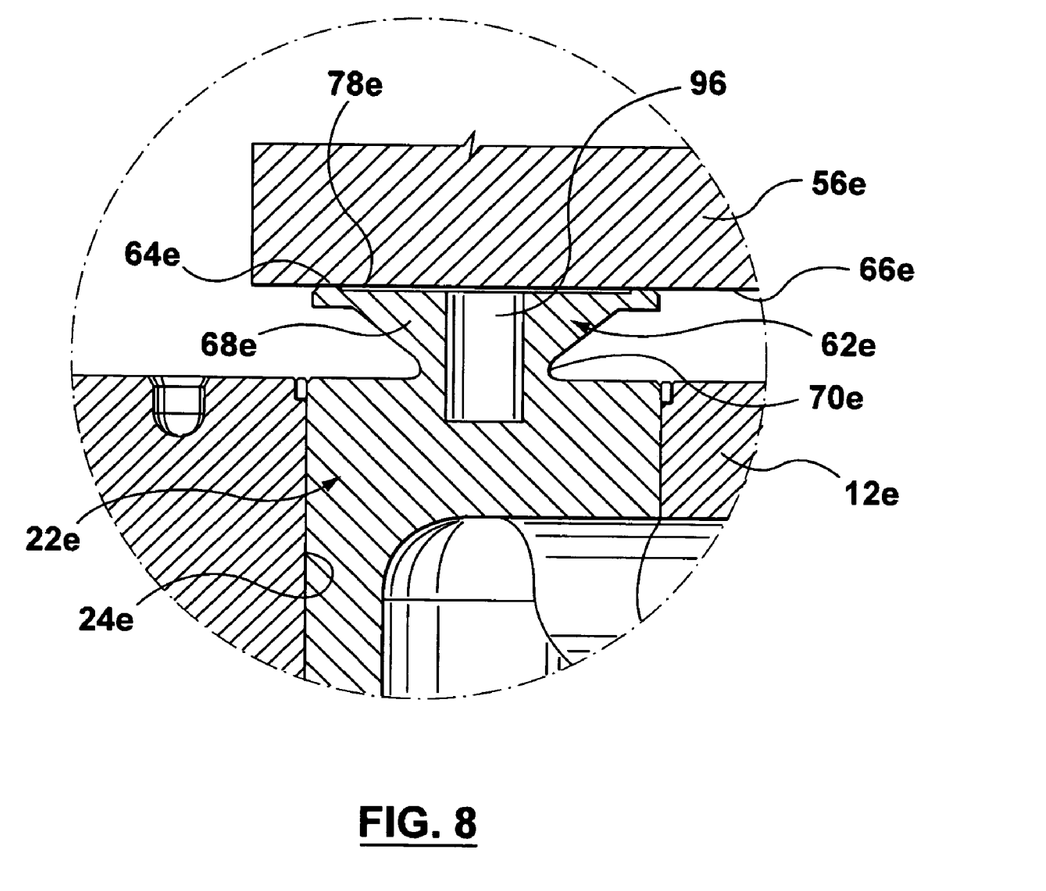
FIG. 8 is an enlarged view of portion A of FIG. 7.

Manifold plug 22e includes a valve disk 62e having an upper surface 64e in contact with a lower surface 66e of back plate 56e. A recess 78e is provided in upper surface 64e of the manifold plug 22e, as shown in FIG. 8. An aperture 96 is also provided in upper surface 64e. The aperture 96 is generally centered in the valve disk 62e and extends through neck 70e of the manifold plug 22e. The recess 78e and the aperture 96 reduce the cross-sectional area of the valve disk 62e and increase the flexibility thereof to improve the deflection capability of the valve disk 62e during thermal expansion. The valve disk 62e further includes a generally conical shaped body 68e that reduces in cross-sectional area between the upper surface 64e and the neck 70e.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
    a manifold having a manifold melt channel for receiving a melt stream of moldable material under pressure positioned between a back plate and a mold plate of the injection molding apparatus;
    a heated nozzle having a nozzle melt channel for receiving the melt stream from the manifold melt channel;
    a manifold plug fit within a bore of the manifold and having a plug melt channel for fluidly connecting the manifold melt channel and the nozzle melt channel, wherein the manifold plug includes a pressure disk portion, wherein the pressure disk portion abuts with the back plate and a downstream end of the manifold plug is received within an interior recess of the nozzle such that an exterior surface of the manifold plug faces an interior surface of the nozzle.

2. The injection molding apparatus of claim 1, wherein the interior surface of the nozzle is coupled to the exterior surface of the downstream end of the manifold plug by a threaded connection.

3. The injection molding apparatus of claim 1, further comprising a valve pin, wherein the pressure disk portion includes a valve pin receiving bore that extends through the manifold plug and joins the plug melt channel.

4. The injection molding apparatus of claim 3, further comprising a valve pin actuator disposed within a cavity of the back plate.

5. The injection molding apparatus of claim 1, wherein the pressure disk portion includes an upper surface that contacts a lower surface of the back plate and a conical shaped body that reduces in cross-sectional area between the upper surface and a neck of the pressure disk portion.

6. The injection molding apparatus of claim 5, wherein the upper surface of the pressure disk portion includes a recess.

7. The injection molding apparatus of claim 5, wherein the pressure disk portion includes an aperture to provide a drain passage in the event of leakage of melt.

8. The injection molding apparatus of claim 5, wherein the pressure disk portion includes an aperture generally centered in the pressure disk portion, wherein the aperture reduces the cross-sectional area of the pressure disk.

9. The injection molding apparatus of claim 1, wherein the manifold plug is press fit into the manifold bore, the manifold plug including an outwardly extending flange including an aperture for receiving a dowel that engages a recess in the manifold to maintain the manifold plug in a proper orientation in the manifold bore.

10. An injection molding apparatus comprising:
    a manifold having a manifold melt channel for receiving a melt stream of moldable material under pressure positioned between a back plate and a mold plate of the injection molding apparatus;
    a heated nozzle having a nozzle melt channel for receiving the melt stream from the manifold melt channel;
    a manifold plug fit within a bore of the manifold and having a plug melt channel for fluidly connecting the manifold melt channel and the nozzle melt channel, wherein the manifold plug includes pressure disk portion, wherein the pressure disk portion includes an upper surface that contacts a lower surface of the back plate and a conical shaped body that reduces in cross-sectional area between the upper surface and a neck of the pressure disk portion, wherein the neck of the pressure disk portion is located adjacent an upper surface of the manifold.

11. The injection molding apparatus of claim 10, wherein a downstream end of the manifold plug is flush with a lower surface of the manifold.

12. The injection molding apparatus of claim 11, wherein the nozzle is disposed in an opening of the mold plate, wherein the nozzle includes a nozzle head having a flange, wherein the flange abuts a step in the opening to maintain the nozzle head in abutment with the lower surface of manifold.

13. The injection molding apparatus of claim 10, wherein a downstream end of the manifold plug is received within an interior recess of the nozzle such that an exterior surface of the manifold plug faces and interior surface of the nozzle.

14. The injection molding apparatus of claim 13, wherein the nozzle is coupled to the downstream end of the manifold plug by a threaded connection.

15. The injection molding apparatus of claim 10, further comprising a valve pin, wherein the pressure disk portion includes a valve pin receiving bore that extends through the manifold plug and joins the plug melt channel.

16. The injection molding apparatus of claim 15, further comprising a valve pin actuator disposed within a cavity of the back plate.

17. The injection molding apparatus of claim 10, wherein the upper surface of the pressure disk portion includes a recess.

18. The injection molding apparatus of claim 10, wherein the pressure disk portion includes an aperture to provide a drain passage in the event of leakage of melt.

19. The injection molding apparatus of claim 10, wherein the pressure disk portion includes an aperture generally centered in the pressure disk portion, wherein the aperture reduces the cross-sectional area of the pressure disk and increases the flexibility thereof.

20. The injection molding apparatus of claim 10, wherein the manifold plug is press fit into the manifold bore, the manifold plug including an outwardly extending flange including an aperture for receiving a dowel that engages a recess in the manifold to maintain the manifold plug in a proper orientation in the manifold bore.

21. An injection molding apparatus comprising:
- a manifold having a manifold melt channel for receiving a melt stream of moldable material under pressure positioned between a back plate and a mold plate of the injection molding apparatus;
- a heated nozzle having a nozzle melt channel for receiving the melt stream from the manifold melt channel;
- a manifold plug fit within a bore of the manifold and having a plug melt channel for fluidly connecting the manifold melt channel and the nozzle melt channel, wherein the manifold plug includes a valve disk portion, wherein the valve disk portion includes a valve pin receiving bore that extends through the manifold plug and joins the plug melt channel, wherein a downstream end of the manifold plug is received within an interior recess of the nozzle such that an exterior surface of the manifold plug faces an interior surface of the nozzle.

22. The injection molding apparatus of claim 21, wherein the nozzle is coupled to the downstream end of the manifold plug by a threaded connection.

23. The injection molding apparatus of claim 21, wherein the valve disk portion includes an upper surface that contacts a lower surface of the back plate.

24. The injection molding apparatus of claim 23, wherein the valve disk portion further includes a conical shaped body that reduces in cross-sectional area between the upper surface and a neck of the valve disk portion.

25. The injection molding apparatus of claim 23, wherein the upper surface of the valve disk portion includes a recess.

26. The injection molding apparatus of claim 23, wherein the valve disk portion includes an aperture to provide a drain passage in the event of leakage of melt.

27. The injection molding apparatus of claim 21, wherein the valve disk portion is integral with the manifold plug.

28. The injection molding apparatus of claim 1, wherein the pressure disk portion is integral with the manifold plug.

29. The injection molding apparatus of claim 10, wherein the pressure disk portion is integral with the manifold plug.

* * * * *